INVENTORS:
J. C. JEPSEN
J. L. RALPH
BY: *Louis J. Bovasso*

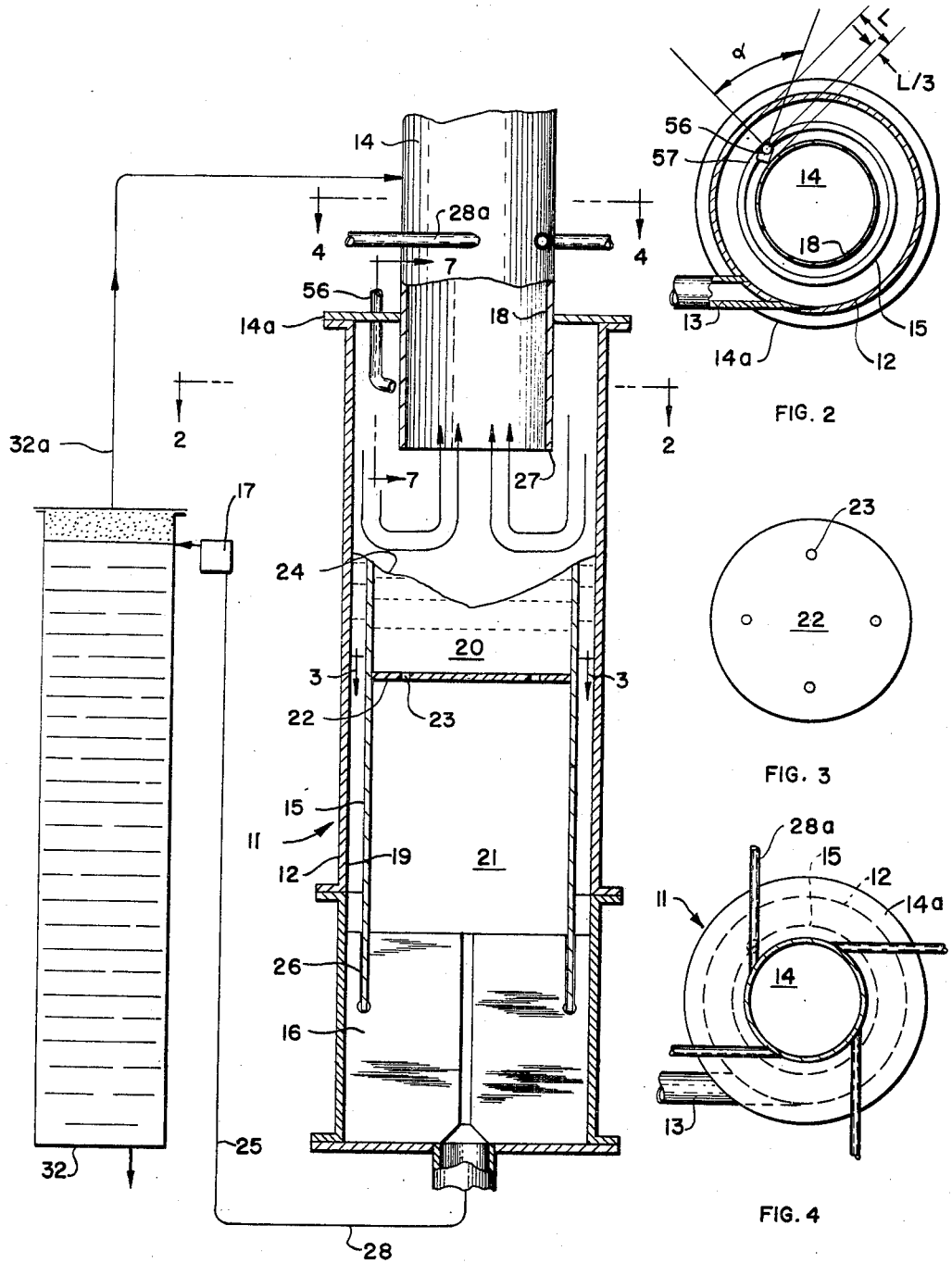

THEIR ATTORNEY

Jan. 13, 1970  J. C. JEPSEN ET AL  3,488,927
GAS-LIQUID CYCLONE SEPARATOR
Filed Oct. 23, 1967  3 Sheets-Sheet 3

INVENTORS:
J. C. JEPSEN
J. L. RALPH
BY: *Louis J. Bovasso*
THEIR ATTORNEY

United States Patent Office 3,488,927
Patented Jan. 13, 1970

3,488,927
GAS-LIQUID CYCLONE SEPARATOR
John C. Jepsen, Moraga, and James L. Ralph, Oakland, Calif., assignors to Shell Oil Company, New York, N.Y., a corporation of Delaware
Filed Oct. 23, 1967, Ser. No. 677,461
Int. Cl. B01d 47/02, 47/00
U.S. Cl. 55—237                                                          6 Claims

ABSTRACT OF THE DISCLOSURE

A gas-liquid cyclone separator is provided having a substantially vertical cylindrical housing with a tangential inlet for gas and liquid at the top. A vortex finder is disposed at the top of the housing and an elongated liquid-immersed seal cylinder is spaced from the housing wall between the finder and a vortex breaker. The separator also includes an effluent liquid overflow weir for removing liquid from the housing while maintaining a liquid seal within the separator.

BACKGROUND OF THE INVENTION

Field of the invention

This invention relates to a gas-liquid cyclone separator and, more particularly, to a separator for delivering gas-free liquid and liquid-free gas effluents under varying flow conditions.

Description of the prior art

Many gas-liquid separators are known in the prior art. However, these separators suffer from a variety of deficiencies when operating under high liquid loading. In certain chemical processes the separator used must rapidly separate the product gas from the liquid phase. The gas phase after being separated from the liquid phase is then quenched. Such rapid separation and quench are necessary since the rate of dimerization, of the desired species in the gas phase for example, at the temperature of the reactor using the separator, is very rapid when the gas phase is separated from the liquid phase. There should be very little product gas entrained with the effluent liquid phase. Also, the problem of liquid entrainment in the gas stream is critical since entrained liquid may cause the product gas quench-scrubber systems to foul.

Usual separator designs, accordingly, are inadequate where the requirements of no entrainment in either effluent stream at high liquid loadings and short gas residence times are present. For example, centrifugal gas-liquid separators are effective only at low liquid loadings. Some liquid entrainment in the effluent gas phase and/or gas entrainment in the effluent liquid stream occurs in all of the prior art separators when operating under relatively high liquid loads.

SUMMARY OF THE INVENTION

It is a primary object of this invention to provide a gas-liquid separator which will deliver both gas-free liquid and liquid-free gas effluents under desired flow conditions with a minimum gas residence time.

It is a further object to provide a gas-liquid separator which will allow rapid separation and partial quenching of the gas phase of a gas-liquid mixture without gas or liquid entrainment in either effluent streams.

It is a still further object of this invention to provide a gas-liquid separator whose vortex finder may be washed with liquid without liquid entrainment in the gas-phase effluent.

The invention is carried out by providing a gas-liquid cyclone separator having a substantially vertical cylindrical housing with a tangential inlet for gas and liquid disposed at its upper portion and a vortex breaker at its lower portion. A vortex finder is disposed at the top of the housing for removing gas therefrom and in communication with the inlet. An elongated liquid-immersed seal cylinder is spaced from the housing well between the vortex finder and breaker. The separator includes an overflow weir in communication with the housing for removing liquid therefrom while maintaining a liquid seal within the separator.

BRIEF DESCRIPTION OF THE DRAWING

FIGURE 1 is a vertical sectional view of a preferred embodiment of the invention;
FIGURES 2 through 4 are views taken along lines 2—2, 3—3, and 4—4 of FIGURE 1, respectively.

DESCRIPTION OF THE PREFERRED EMBODIMENTS

Figure 6:
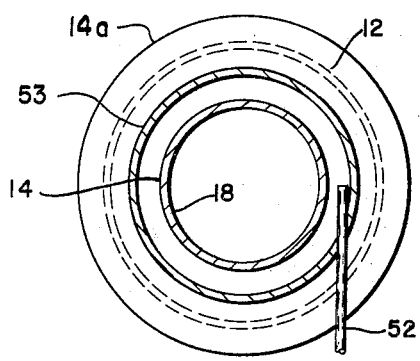
FIGURE 6 is a view taken along line 6—6 of FIGURE 5.

Referring to the drawing, FIGURE 1 shows a gas-liquid cyclone separator 11 comprising a substantially vertical cylindrical housing 12 having a tangential inlet 13 (FIGURE 2) and a gas vortex finder 14 in communication with the interior of housing 12. A seal cylinder 15 is disposed in the separation section below inlet 13 and supported in slots 26 in a liquid vortex breaker 16 which is in communication with an overflow weir 17. The tangential gas-liquid inlet 13 imparts a tangential motion to a two-phase (i.e., gas and liquid) mixture introduced into the separator 11 and the vortex finder 14 removes the separated gas phase. The finder 14 is connected to the separation section formed by cylindrical wall 19 through flange 14a.

In operation, a two-phase mixture is introduced into separator 11 through inlet 13 and thus enters tangentially at a desired velocity, preferably at a relatively high velocity, and flows downward in a spiral motion to the seal cylinder 15 where the gas and liquid phases are separated. The initial separation of the gas and liquid phases is achieved by the tangential motion of the mixture on wall 19. The vortexing motion of the gas phase in the separation section is disturbed as little as possible so as to maintain this motion of the gas in the vortex finder 14. This minimizes liquid entrainment by forcing any entrained liquid to the wall 18 of the finder 14. Once the liquid is deposited on wall 18, it flows on the wall 18, either returning to the separation section or flowing on up out of the finder 14, depending on the superficial gas velocity in the vortex finder 14.

The seal cylinder 15 rapidly separates the two phases without entraining liquid in the effluent gas stream or gas in the effluent liquid stream. The separation section consists of the internal wall 19 of the separator 11 and the seal cylinder 15 which is centered inside wall 19 and substantially equally spaced therefrom. Cylinder 15 is divided into two open-ended upper and lower sections 20 and 21, respectively, by a substantially flat circular divider plate 22 located in the cylinder 15 and fixed thereto. A plurality of equally-spaced small diameter holes 23 are preferably located in the plate 22 close to the inside wall 19 of the cylinder 15 (see FIGURE 3 showing four such holes for convenience of illustration). If these holes 23 are placed in the center of plate 22, liquid will be rejected as slugs into the gas phase and will pass into finder 14. Likewise, if the hole diameters are too large or if they are not symetrically spaced in plate 22, the liquid flow rate through the holes disrupts the vortexing motion of the liquid.

In operation, as discussed hereinabove, separation of the gas and liquid phases is achieved by the tangential motion of the mixture on the wall 19 of the separator 11 above the cylinder 15. This tangential motion forces the liquid phase to flow on the wall 19 of the separator 11 while the gas phase flows in the region between the vortex finder 14 and the surface 24 of the liquid film. When the gas and liquid phases reach the top of the seal cylinder 15, the liquid phase flows down the annulus between the cylinder 15 and the wall 19 of the separator 11 while the gas phase flows above surface 24 and then out through the vortex finder 14 as indicated by the arrows in FIGURE 1. Section 20 is thus filled with liquid in the shape of an inverted cone as shown in FIGURE 1 which is rotating in the same direction as the injected gas-liquid stream as will be discussed further hereinbelow. Gas entrainment in the effluent liquid is minimized by maintaining a liquid seal between cylinder 15 and wall 19 of separator 11. The liquid seal is formed by forcing the effluent liquid leaving separator 11 to flow over overflow weir 17 which is set at the same height as the top of cylinder 15.

In the embodiment of FIGURE 1, the liquid passing over the overflow weir 17 preferably discharges into a surge vessel 32 so as to prevent bridging of the liquid between the weir 17 and the wall of the surge vessel. A pressure equalization line 32a may be disposed between the gas cap above weir 17 and the vortex finder 14. Overflow weir 17 preferably includes a substantially vertical leg portion 25 in communication with separator 11 through a substantially horizontal liquid outlet portion 28.

Plate 22 divides cylinder 15 into two sections so as to minimize the volume of the separator 11 which is available to the gas phase. The location of plate 22 in cylinder 15, however, is determined by the vortexing motion of the liquid in cylinder 15 above plate 22. Plate 22 must be positioned so as to minimize disturbances in the liquid as these disturbances will result in liquid slugging into the vortex finder 14.

Plate 22 serves the additional purpose of minimizing the gas volume of separator 11. Additionally, the holes in plate 22 return gas which may be entrained in the effluent liquid discharging from between the wall 19 of separator 11 and the cylinder 15 back to the gas-liquid separation section. The gas phase which is separated from the liquid phase at the top of the cylinder 15 is rotating tangentially at a high velocity. As a result, liquid which occasionally flows into the upper half of the seal cylinder 15 is forced to rotate tangentially due to its interaction with the gas phase. The liquid forms an inverted cone with the base of the cone ending at wall 19 of the separator 11 slightly above the top of the seal cylinder 15 as can be seen in FIGURE 1. This rotational motion of the liquid allows any excess liquid in cylinder 15 to be removed and returned to wall 19 without causing liquid entrainment in the gas phase.

The rotational motion of the liquid also produces an ejection effect through the holes 23 in plate 22. A pressure differential is caused which is sufficient to keep the lower half 21 of cylinder 15 filled with liquid. Gas which is entrained by the effluent liquid leaving the separation section rises into the lower half 21 and is returned to the separation section through holes 23. The diameter of the liquid vortex breaker section is such that all gas which passes into this section rises and passes into the lower half 21 of cylinder 15 and thus back to the separation section.

The liquid vortex breaker 16 stops the vortexing motion of the effluent liquid below cylinder 15. The vortexing motion of the liquid is stopped so as to allow any gas which may have been entrained to rise into lower section 21 of cylinder 15 and to maximize the rate of discharge of liquid from wall 19 of separator 11. If the tangential motion of the liquid is not stopped, the liquid tends to remain on wall 19 and restricts the flow of liquid into the annular area between seal cylinder 15 and wall 19. This, in turn, may cause the separator 11 to flood at a much lower liquid rate. The diameter of the portion of separator 11 containing the vortex breaker 16 must be large enough so that the superficial liquid velocity is less than the rise velocity of the gas bubbles if recovery of entrained gas is desired.

The overflow weir 17 maintains a liquid seal in the gas-liquid separation section. Weir 17 is preferably set at approximately the same height as the top of cylinder 15; if the height of weir 17 extended substantially above the top of cylinder 15, the separator 11 would flood.

As discussed above, plate 22 divides cylinder 15 into two separate compartments. The operation of the separator 11 is independent of the exact location of plate 22 in the cylinder 15; however, the plate 22 should be disposed at least one cylinder diameter below the top of the cylinder 15. Location of plate 22 above this point would result in flow disturbances with the slugging of liquid into finder 14. Also, the distance between the top of cylinder 15 and plate 22 is preferably equal to or greater than the vertical distance between the top of cylinder 15 and the mouth 27 of finder 14.

It is preferred to maintain a liquid seal near the top of cylinder 15. The length of the vortex finder 14 is not critical as long as it extends a short distance below the bottom of the inlet 13. The vertical distance between the mouth 27 of finder 14 and the top of cylinder 15 depends upon the velocity of the gas stream between the finder 14 and cylinder 15. For example, superficial gas velocities of 5 ft./sec. or less may have no effect on the operation of the separator whereas gas velocities in excess of 5 ft./sec. may result in entrainment of liquid in the vortex finder 14.

In order to prevent fouling of the vortex finder 14 which will cause entrainment of the liquid, the inside of finder 14 is preferably washed with a wash liquid. This may be accomplished by providing a plurality of horizontal tangential nozzles 28a spaced 90° apart as illustrated in FIGURE 4. The wash liquid is injected in the same direction as the vortexing motion of the gas effluent. Although four such nozzles spaced 90° apart have been shown for convenience of illustration, similar results may be obtained with other arrangements.

Figure 5:
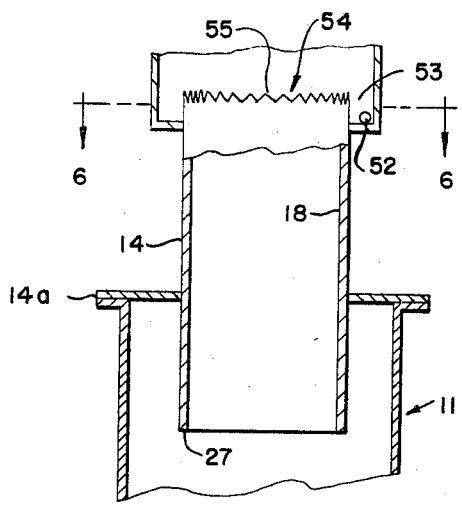
FIGURE 5 is a vertical sectional view of a modification of a portion of the embodiment of FIGURE 1.

As an alternative to nozzles 28a, an overflow weir 54 may be provided on top of the vortex finder 14 as shown in FIGURE 5. The wash liquid is preferably fed tangentially in the same direction as the vortexing motion of the gas stream through wash inlet 52 (FIGURE 6) into a reservoir 53 located around the vortex finder 14 and passes over the notched top 55 of weir 54 and down the inside wall 18 of finder 14. Notches 55 are preferably V-notches. This embodiment effectively distributes the wash liquid on the finder wall 18.

Figure 7:
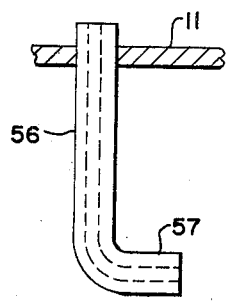
FIGURE 7 is a view taken along line 7—7 of FIGURE 1.

Referring once more to FIGURE 1, it may be desirable to maintain a very rapid liquid-gas separation while partially quenching the gas stream. For example, a high rate of dimerization of a species in the gas phase can be reduced to a very negligible value by significantly reducing the gas temperature. Accordingly, in the separator of FIGURE 1, a flashing fluid, such as liquid nitrogen, is injected into the gas core by means of a horizontal tube or quench nozzle 56 (FIGURES 7 and 8) located at the same height of the center line of inlet 13. Nozzle 56 is preferably oriented so that the fluid is injected perpendicular to the axis of the finder 14 and in the same direction of the vortexing motion of the gas stream.

As can be best seen in FIGURE 2, angle α designates the minimum angle possible for the orientation of the nozzle exit 57 of nozzle 56 so as to eliminate impingement on the vortex finder 14. As illustrated in FIGURE 2, the nozzle exit 57 is preferably adjusted so that it is exactly 3/1. from the wall 18 of finder 14.

Figure 8:
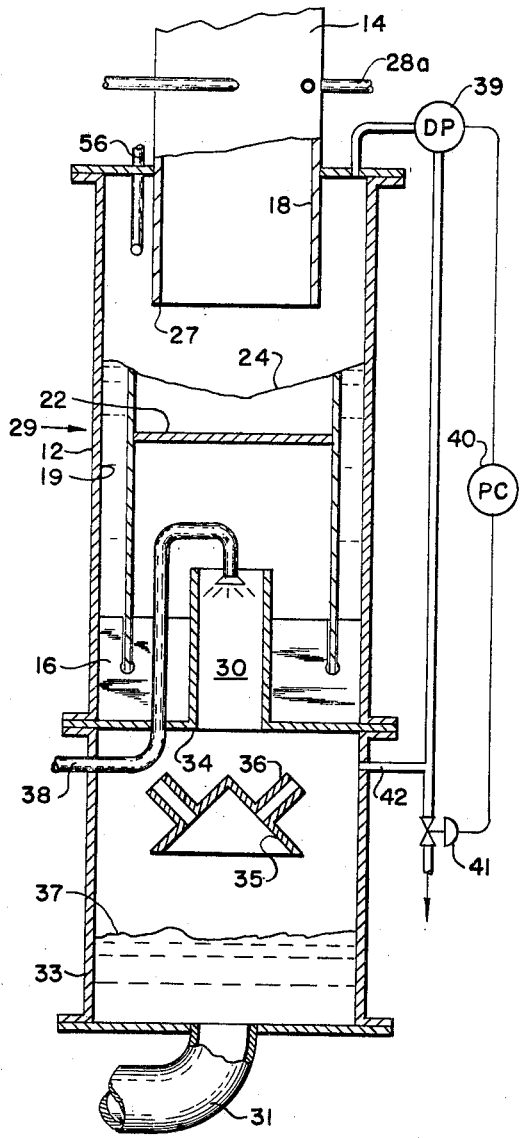
FIGURES 8 and 9 are vertical sectional views of alternate embodiments of the invention.

Instead of an external weir as illustrated in FIGURE 1, the separator may include an internal weir as illustrated in FIGURE 8 wherein like numerals refer to like parts of FIGURE 1. Here, separator 29 includes a substantially vertical overflow weir 30 disposed within housing 12 and in communication with a liquid outlet portion 31 coupled to an effluent liquid discharge line (not shown). Plate 22' is an imperforate plate sealed within cylinder 15.

In this embodiment, a gas-capped liquid surge vessel 33 is located directly below and in communication with the outlet portion 34 of weir 30. A liquid deflector cone 35 having a plurality of upwardly and outwardly extending gas vents or breather tubes 36 is disposed within the housing 12 directly below weir outlet portion 34 and above surge vessel 33. A liquid seal 37 is formed at the top of vessel 33 below cone 35.

In operation, no syphoning occurs in the separator liquid discharge line with the embodiment of FIGURE 8. As a result, the liquid seal level 24 located at the top of the weir 30 remains constant with changes in the gas and liquid flow rates. Entrainment of gas bubbles formed by the separator liquid effluent impinging on the surface of the surge vessel liquid seal 37 is minimized by the cone 35. Cone 35 forces the separator effluent to discharge into the surge vessel 33 near the walls of the vessel 33. Gas bubbles formed in this area will de-entrain before the liquid leaves the surge vessel 33. The breather tubes 36 in the deflector cone 35 prevent gas from being trapped underneath the cone 35. Complete elimination of gas entrainment in the liquid surge vessel 33 may be obtained by operating the separator 29 such that the surge vessel superficial liquid velocity is less than the rise velocity of the entrained gas bubbles.

Operation of separator 29 with the liquid seal 24 located at the top of the seal cylinder 15 is obtained by controlling the pressure differential between the surge vessel gas cap and the top of separator 29. This pressure differential is equal to the static head of liquid desired above overflow weir 30. Automatic control of the pressure differential is obtained by purging the surge vessel 33 with a fixed gas flow through purge gas inlet 38. The exit air flow is preferably varied so as to maintain a constant pressure differential. This may be accomplished by connecting a differential pressure (DP) cell 39 between the separator 29 and surge vessel 33. The signal from the DP cell 39 is preferably fed into a pneumatic valve controller 40 which operates a pneumatic valve 41 located in the purge gas discharge line 42 in communication with surge vessel 33. The purge gas is preferably injected into surge vessel 33 at the mouth of the overflow weir 30 as illustrated in FIGURE 8. Alternately, the purge gas may be injected into the gas cap located directly above cone 35. The specific location of discharge line 42 in vessel 33 is not critical as long as entrainment of liquid does not occur. This embodiment permits ready adjustment of the liquid seal level and thus greater separator efficiency and stability to flow fluctuations.

Figure 9:
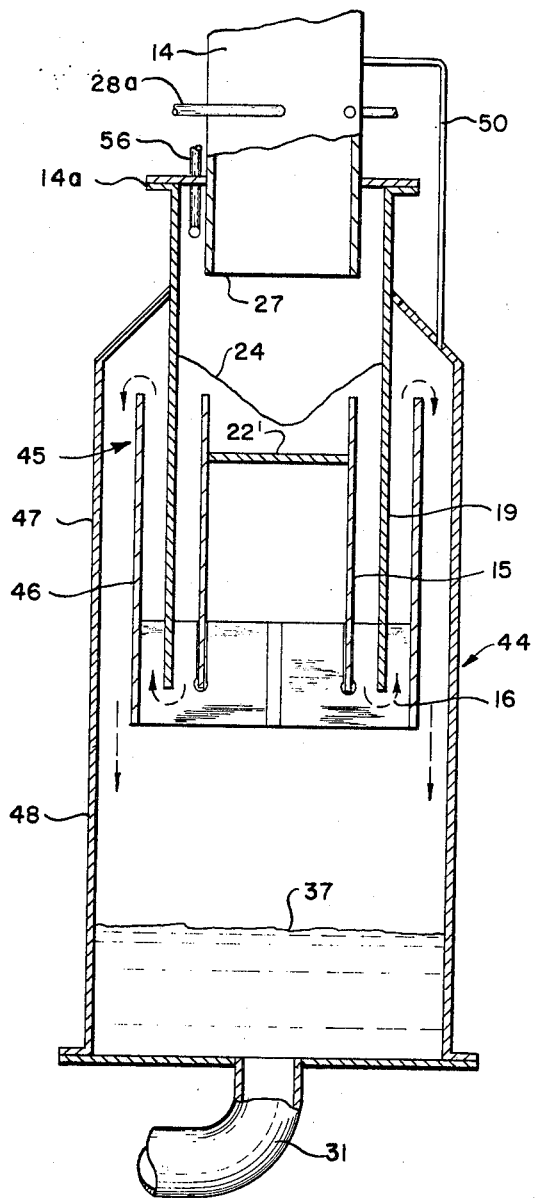

FIGURE 9 illustrates another embodiment of a separator 44 wherein like numerals refer to like parts of FIGURE 8. In this embodiment, the overflow weir 45 consists of two concentric vessels 46 and 47 placed around the outside of the seal cylinder 15. The inner vessel 46 serves as the overflow weir. The outer vessel 47 serves as a liquid surge vessel 48. The liquid effluent passes between wall 19 of separator 44 and seal cylinder 15 and up between the inner vessel 46 and wall 19, over the top 49 of vessel 46 and down into surge vessel 48 as indicated by the dotted arrows in FIGURE 9. A pressure equalization line 50 is preferably used to connect the gas cap above weir 45 with the vortex finder 14. Since the overflow weir 45 is located at the preferred location, i.e., the top of cylinder 15, this embodiment of the invention does not require gas purging as does the embodiment of FIGURE 8 which requires the liquid seal to be maintained at the top of the seal cylinder 15.

In all embodiments, the following is an example of maximum allowable superficial velocities for use on the gas-liquid separators.

| Section | Phase | Superficial velocity, ft./sec. |
|---|---|---|
| Vortex finder | Gas | 30.0,[1] 20.0.[2] |
| Area between separator barrel and vortex finder. | Gas plus liquid | 17.0. |
| Area between separator barrel and seal cylinder. | Liquid | 2.5. |
| Area between mouth of vortex finder and top of seal cylinder. | Gas | 5.0. |
| Area of separator containing the vortex breaker. | Liquid | 0.8 x gas bubble rise velocity.[3] |
| Area between seal cylinder and internal overflow weir. | do | 2.0. |
| Area of liquid surge vessel | do | 0.8 x gas bubble rise velocity.[3] |
| Area of internal liquid overflow weir | do | 6.0.[4] |

[1] No liquid wash in vortex finder.
[2] Liquid wash in vortex finder up to 1.0 g.p.m./ft. wetted perimeter.
[3] Required for recovery of entrained gas in bottom half of seal cylinder. If gas recovery is not desired, the diameter is controlled by the separator barrel diameter.
[4] Maximum allowable liquid velocity in internal overflow weir. If size of separator used is such that this velocity is exceeded, the external overflow weir of Figure 1 must be used.

The tangential inlets to the separators are preferably circular; however, if the diameter of this inlet is such that the incoming two-phase stream impinges directly on the vortex finder, a rectangular-shaped entrance with the same cross-section is preferred so as to prevent direct impingement on the finder. The top of the vortex breaker may extend up to the seal cylinder divider plate inside the cylinder.

We claim as our invention:
1. A gas-liquid separator for separating a gas-liquid mixture, including a gas phase and a liquid phase, comprising:
　a substantially vertical hollow cylindrical housing having a bottom wall, a top wall and cylindrical side wall;
　a gas-liquid mixture inlet means tangential to said cylindrical wall and adjacent to said top wall, in communication with the interior of said housing for introducing said mixture in a vortexing motion within said housing;
　a tube extending through the top wall coaxially with said cylindrical wall and in communication with the interior of said housing for removing said gas phase therefrom;
　a substantially vertical seal cylinder, of larger diameter than said tube, equally spaced from said cylindrical wall and coaxially supported within said housing adjacent to and below the lower end of said tube for rapidly separating the gas phase of said mixture from the liquid phase;
　said cylinder being divided into two substantially open-ended upper and lower sections by a substantially flat, circular, generally horizontal divider plate, located within the cylinder and affixed to the wall thereof;

said plate being impervious except for a plurality of equally-spaced small-diameter holes symmetrically spaced in said plate and disposed close to the wall of the cylinder;

liquid vortex breaker means disposed within said cylindrical housing above said bottom wall and below said seal cylinder for stopping the vortexing motion of said liquid phase;

said bottom wall having a liquid outlet therein; and liquid overflow weir means external to the housing connected to said liquid outlet to provide a liquid seal between the seal cylinder and the wall of the housing.

2. The separator of claim 1, wherein said weir means is set at the same height as the top of said seal cylinder; and said weir means including a substantially vertical leg portion in communication with said housing through a substantially horizontal liquid outlet portion which communicates with said breaker means.

3. The separator of claim 2 wherein said plate is disposed at least one cylinder diameter below the top of said cylinder.

4. The separator of claim 3 wherein the distance between the top of said cylinder and said plate is at least equal to the distance between the top of said cylinder and the lowermost portion of said tube.

5. The separator of claim 1 wherein the tube includes a mouth portion extending at least a short distance below said inlet means.

6. The separator of claim 1 including washing means tangential to said tube and communicating with the interior thereof for introducing a cleansing element adapted to prevent fouling of said tube.

References Cited

UNITED STATES PATENTS

| Number | Date | Name | Class |
|---|---|---|---|
| 1,553,973 | 9/1925 | Ballou | 55—459 |
| 1,978,802 | 10/1934 | Lissman | 209—144 |
| 2,016,642 | 10/1935 | Lincoln | 210—512 |
| 2,106,589 | 1/1938 | Bigger et al. | 55—205 |
| 2,302,116 | 11/1942 | Gill | 210—512 |
| 2,465,021 | 3/1949 | Kennison et al. | 210—512 |
| 2,511,967 | 6/1950 | Campbell | 210—512 |
| 2,545,028 | 3/1951 | Haldeman | 55—204 |
| 2,607,438 | 8/1952 | Bailey | 55—263 |
| 2,717,695 | 9/1955 | Martin | 209—211 |
| 2,869,677 | 1/1959 | Yellott et al. | 55—398 |
| 2,913,112 | 11/1959 | Stavenger et al. | 209—211 |
| 3,060,664 | 10/1962 | Morawski | 210—512 |
| 3,093,468 | 6/1963 | Krochta | 55—238 |
| 3,126,266 | 3/1964 | Meisler | 62—40 |
| 3,149,939 | 9/1964 | Larsen | 55—204 |
| 3,163,508 | 12/1964 | Tuck et al. | 55—204 |
| 3,206,917 | 9/1965 | Kaiser et al. | 210—512 |
| 3,212,234 | 10/1965 | McMinn | 55—204 |
| 3,304,697 | 2/1967 | Ramsey | 55—459 |
| 3,324,632 | 6/1967 | Berneike et al. | 55—459 |

HARRY B. THORNTON, Primary Examiner

BERNARD NOZICK, Assistant Examiner

U.S. Cl. X.R.

55—261, 424, 431, 459; 209—211; 210—512